(12) United States Patent
Nagai et al.

(10) Patent No.: US 11,245,750 B2
(45) Date of Patent: Feb. 8, 2022

(54) FILE SERVER LOAD BALANCING

(71) Applicant: International Business Machines Corporation, Armonk, NY (US)

(72) Inventors: Shingo Nagai, Tokyo (JP); Yutaka Kawai, Suginami (JP); Yohichi Miwa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/278,066

(22) Filed: Feb. 16, 2019

(65) Prior Publication Data

US 2020/0267211 A1 Aug. 20, 2020

(51) Int. Cl.
*H04L 29/08* (2006.01)
*H04L 29/12* (2006.01)
*G06F 16/182* (2019.01)
*G06F 11/34* (2006.01)

(52) U.S. Cl.
CPC ...... *H04L 67/1008* (2013.01); *G06F 11/3433* (2013.01); *G06F 16/182* (2019.01); *H04L 61/1511* (2013.01); *G06F 2201/875* (2013.01)

(58) Field of Classification Search
CPC ............. H04L 67/1008; H04L 61/1511; G06F 16/182; G06F 11/3433
See application file for complete search history.

(56) References Cited

U.S. PATENT DOCUMENTS

| | | | | |
|---|---|---|---|---|
| 6,412,079 B1 * | 6/2002 | Edmonds | ............ | G06F 11/2007 714/11 |
| 6,473,396 B1 * | 10/2002 | Kumar | ............ | H04L 29/12009 370/216 |
| 6,950,848 B1 * | 9/2005 | Yousefi'zadeh | .......... | G06F 9/50 707/999.01 |
| 7,191,225 B1 * | 3/2007 | Borthakur | ............... | G06F 16/10 709/213 |
| 7,386,616 B1 * | 6/2008 | Henzinger | .............. | G06F 9/505 709/226 |
| 7,676,587 B2 * | 3/2010 | Faibish | ................... | H04L 61/10 709/230 |
| 7,743,155 B2 * | 6/2010 | Pisharody | ............... | H04L 67/14 709/227 |
| 8,243,589 B1 * | 8/2012 | Trost | ................... | H04L 67/1034 370/220 |

(Continued)

*Primary Examiner* — Blake J Rubin
(74) *Attorney, Agent, or Firm* — Nelson IP; Daniel P. Nelson

(57) ABSTRACT

A method for balancing load across multiple file servers is disclosed. In one embodiment, such a method includes monitoring load experienced by multiple file servers arranged in an active-active configuration. The method receives, from a client node, a request for an address associated with one of the file servers. The method determines a particular file server of the file servers that, if assigned to the client node, would reduce load imbalance between the file servers. In certain embodiments the particular file server is the file server experiencing the least load. The method returns, to the client node in response to the request, an address associated with the particular file server, thereby enabling the client node to mount the particular file server to access files thereon. A corresponding system and computer program product are also disclosed.

20 Claims, 5 Drawing Sheets

(56) References Cited

U.S. PATENT DOCUMENTS

| | | | | |
|---|---|---|---|---|
| 8,478,902 B1* | 7/2013 | Holland | H04L 12/6418 | 709/238 |
| 8,554,918 B1* | 10/2013 | Douglis | G06F 11/3433 | 709/226 |
| 8,621,556 B1* | 12/2013 | Bharali | H04L 61/1511 | 726/1 |
| 8,804,494 B1* | 8/2014 | Uberoy | H04L 41/0663 | 370/219 |
| 8,819,344 B1* | 8/2014 | Faibish | G06F 3/0659 | 711/147 |
| 8,959,173 B1* | 2/2015 | Robidoux | G06F 9/5088 | 709/216 |
| 8,972,657 B1* | 3/2015 | Armangau | G06F 3/0613 | 711/114 |
| 9,143,558 B2* | 9/2015 | Blander | H04L 67/1029 | |
| 9,158,714 B2* | 10/2015 | Randhawa | G06F 13/385 | |
| 9,430,480 B1* | 8/2016 | Bono | G06F 3/0635 | |
| 9,495,119 B1* | 11/2016 | Gong | G06F 3/061 | |
| 9,514,180 B1* | 12/2016 | Cadarette | G06F 16/2358 | |
| 9,594,822 B1* | 3/2017 | Natanzon | G06F 16/275 | |
| 9,628,436 B1* | 4/2017 | Britt | H04L 61/6009 | |
| 9,720,601 B2* | 8/2017 | Gupta | G06F 3/0635 | |
| 9,727,578 B2 | 8/2017 | Eshel et al. | | |
| 10,009,215 B1* | 6/2018 | Shorey | G06F 3/0634 | |
| 10,025,873 B2* | 7/2018 | Jackson | G06F 16/972 | |
| 10,567,492 B1* | 2/2020 | Natarajan | H04L 67/1036 | |
| 10,771,318 B1* | 9/2020 | Haltore | H04L 61/10 | |
| 2002/0133491 A1* | 9/2002 | Sim | H04L 67/1023 | |
| 2005/0172161 A1* | 8/2005 | Cruz | G06F 11/2025 | 714/4.11 |
| 2006/0092950 A1* | 5/2006 | Arregoces | H04L 63/0254 | 370/396 |
| 2006/0193252 A1* | 8/2006 | Naseh | H04L 45/04 | 370/225 |
| 2006/0195607 A1* | 8/2006 | Naseh | H04L 67/1008 | 709/238 |
| 2007/0094361 A1* | 4/2007 | Hoynowski | G06F 11/1443 | 709/220 |
| 2007/0168495 A1* | 7/2007 | Rothstein | H04L 67/1097 | 709/224 |
| 2007/0253328 A1* | 11/2007 | Harper | H04L 45/00 | 370/219 |
| 2009/0106255 A1* | 4/2009 | Lacapra | G06F 11/1076 | |
| 2009/0271472 A1* | 10/2009 | Scheitler | G06F 9/485 | 709/202 |
| 2011/0078318 A1* | 3/2011 | Desai | H04L 29/08171 | 709/228 |
| 2012/0102192 A1* | 4/2012 | Takeshima | H04L 29/12066 | 709/224 |
| 2012/0240129 A1* | 9/2012 | Kanso | G06F 9/505 | 718/105 |
| 2012/0303800 A1* | 11/2012 | Maldaner | G06F 9/5011 | 709/224 |
| 2013/0054806 A1* | 2/2013 | Francis | H04L 65/105 | 709/226 |
| 2013/0103787 A1* | 4/2013 | Glover | G06F 9/5083 | 709/217 |
| 2013/0179876 A1* | 7/2013 | Aliminati | H04L 63/0209 | 717/177 |
| 2013/0297798 A1* | 11/2013 | Arisoylu | H04L 67/1027 | 709/226 |
| 2013/0304904 A1* | 11/2013 | Mouline | H04M 3/323 | 709/224 |
| 2014/0040479 A1* | 2/2014 | Dunn | H04L 47/125 | 709/226 |
| 2014/0095582 A1 | 4/2014 | Eshel et al. | | |
| 2015/0106420 A1* | 4/2015 | Warfield | H04L 41/5041 | 709/201 |
| 2015/0124622 A1* | 5/2015 | Kovvali | H04L 67/1006 | 370/236 |
| 2015/0178137 A1* | 6/2015 | Gordon | H04L 67/1008 | 709/226 |
| 2015/0378767 A1* | 12/2015 | Tarasuk-Levin | G06F 9/5088 | 718/1 |
| 2016/0134561 A1* | 5/2016 | Jacoby | H04L 47/805 | 709/223 |
| 2016/0315814 A1* | 10/2016 | Thirumurthi | H04L 49/35 | |
| 2017/0048146 A1* | 2/2017 | Sane | H04L 47/125 | |
| 2017/0070419 A1 | 3/2017 | Singhal et al. | | |
| 2017/0111457 A1* | 4/2017 | Rivera | H04L 67/148 | |
| 2018/0157521 A1* | 6/2018 | Arikatla | G06F 9/45558 | |
| 2018/0157522 A1* | 6/2018 | Bafna | G06F 9/45558 | |
| 2018/0157752 A1* | 6/2018 | Arikatla | G06F 16/182 | |
| 2018/0205787 A1 | 7/2018 | Ben Dayan et al. | | |
| 2018/0219775 A1* | 8/2018 | Jiang | H04L 45/74 | |
| 2018/0260125 A1* | 9/2018 | Botes | G06F 3/0617 | |
| 2018/0302321 A1* | 10/2018 | Manthiramoorthy | H04L 49/1569 | |
| 2019/0025903 A1* | 1/2019 | Mehta | G06F 1/3287 | |
| 2019/0036848 A1* | 1/2019 | Kommula | H04L 47/125 | |
| 2019/0042325 A1* | 2/2019 | Nair | G06F 11/00 | |
| 2019/0079804 A1* | 3/2019 | Thyagarajan | G06F 9/45533 | |
| 2019/0188022 A1* | 6/2019 | Jung | G06F 9/45558 | |
| 2019/0327312 A1* | 10/2019 | Gupta | H04L 63/02 | |
| 2020/0028730 A1* | 1/2020 | Fan | H04L 41/0893 | |
| 2020/0137157 A1* | 4/2020 | Joseph | H04L 41/0803 | |
| 2021/0326223 A1* | 10/2021 | Grunwald | G06F 3/0632 | |

* cited by examiner

FILE SERVER LOAD BALANCING

BACKGROUND

Field of the Invention

This invention relates to systems and methods for balancing load across multiple file servers.

Background of the Invention

In certain environments, multiple nodes may be used as file servers (e.g., Network File System (NFS) or Common Internet File System (CIFS) file servers) to provide high availability and to balance load across the file servers. In an active-active configuration, when a client node attempts to connect to a file server by requesting a file server address, a domain name system (DNS) server may determine a target file server and provide, to the client node, a virtual IP address associated with the target file server. The client node may then mount the file server associated with the virtual IP address in order to access files thereon. The client node will typically continue to access files on the same file server that is assigned to it by the DNS server until the client node unmounts the file server. At that point, the client node may be assigned the same or a different virtual IP address (corresponding to the same or a different file server) the next time it requests an address from the DNS server.

When a DNS server assigns a virtual IP address to a client node, the DNS server will typically do so in a round-robin manner. That is, the DNS server will assign virtual IP addresses in a particular pre-determined sequence. The DNS server typically does so without considering loads on the file servers. Thus, using the round-robin approach, when a client node requests a virtual IP address associated with a file server, the DNS server may assign a virtual IP address associated with a file server that is experiencing a significant Load, even though there might be another file server that is experiencing a significantly lower Load and would be a better candidate to serve files to the requesting client node.

In view of the foregoing, what are needed are systems and methods to more effectively assign file servers to client nodes. Ideally, such systems and methods will consider the load on file servers in an active-active configuration and take actions to balance the load therebetween.

SUMMARY

The invention has been developed in response to the present state of the art and, in particular, in response to the problems and needs in the art that have not yet been fully solved by currently available systems and methods. Accordingly, systems and methods have been developed to more effectively balance load across multiple file servers. The features and advantages of the invention will become more fully apparent from the following description and appended claims, or may be learned by practice of the invention as set forth hereinafter.

Consistent with the foregoing, a method for balancing load across multiple file servers is disclosed. In one embodiment, such a method includes monitoring load experienced by multiple file servers arranged in an active-active configuration. The method receives, from a client node, a request for an address associated with one of the file servers. The method determines a particular file server of the file servers that, if assigned to the client node, would reduce load imbalance between the file servers. In certain embodiments the particular file server is the file server experiencing the least load. The method returns, to the client node in response to the request, an address associated with the particular file server, thereby enabling the client node to mount the particular file server to access files thereon.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
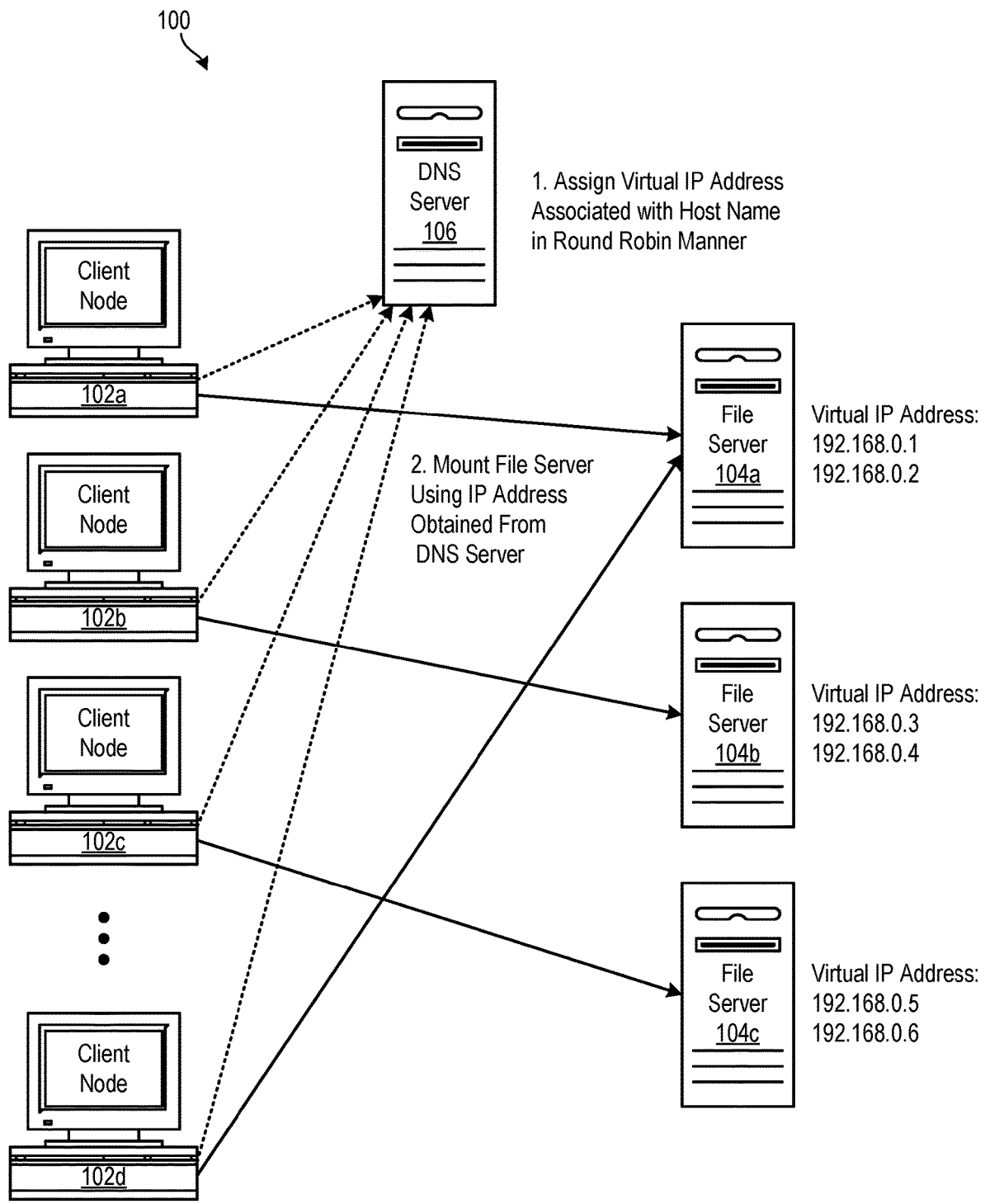
FIG. 1 is a high-level block diagram showing an environment where addresses are assigned to client nodes in a round-robin manner.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, as previously mentioned, in certain cases, multiple nodes 104 may be used as file servers 104 (e.g., Network File System (NFS) or Common Internet File System (CIFS) file servers 104) to provide high availability and to balance load across the file servers 104. In an active-active configuration, where multiple servers actively run the same service simultaneously, when a client node 102 attempts to connect to a file server 104 by requesting a file server address, a domain name system (DNS) server 106 may determine a target file server 104 and provide, to the client node 102, a virtual IP address associated with the target file server 104. The client node 102 may then mount the file server 104 associated with the virtual IP address in order to access files thereon. The client node 102 will typically continue to access files on the same file server 104 that is assigned to it by the DNS server 106 until the client node 102 unmounts the file server 104. The client node 102 may be assigned the same or a different virtual IP address (corresponding to the same or a different file server 104) the next time it requests an address from the DNS server 106.

When a DNS server 106 assigns a virtual IP address to a client node 102, the DNS server 106 conventionally does so in a round-robin manner. That is, the DNS server 106 will assign virtual IP addresses in a particular pre-determined sequence. The DNS server 106 typically does so without considering loads on the file servers 104. Thus, using the round-robin approach, when a client node 102 requests a virtual IP address associated with a file server 104, the DNS server 106 may assign a virtual IP address associated with a file server 104 that is experiencing a significant Load, even though there might be another file server 104 that is experiencing a significantly lower Load and would be a better candidate to serve files to the requesting client node 102. Thus, systems and methods are needed to more effectively assign file servers 104 to client nodes 102. Ideally, such systems and methods will consider the load on the file servers 104 and take actions to reduce load imbalance between the file servers 104.

Figure 2:
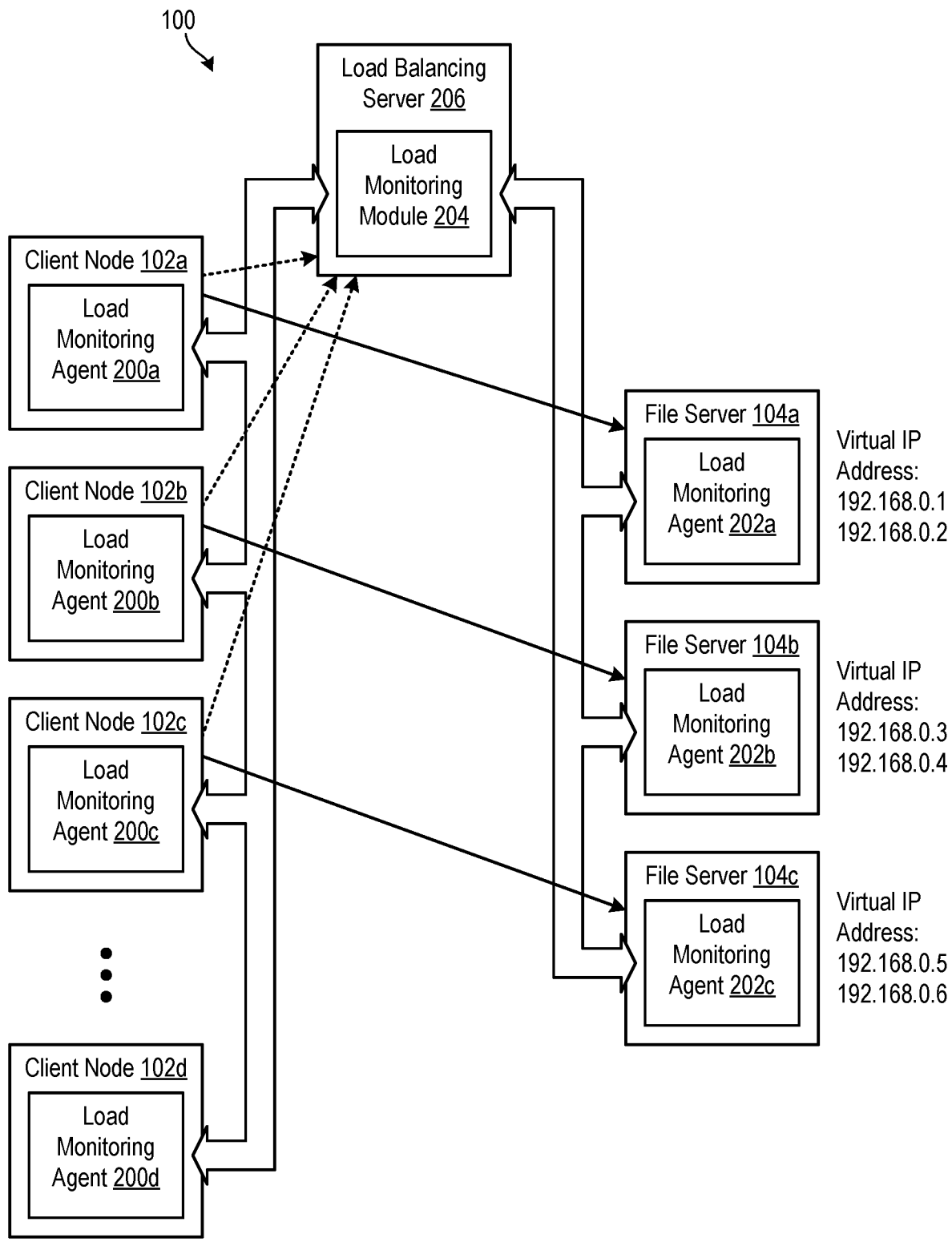
FIG. 2 is a high-level block diagram showing an improved environment in accordance with the invention.

Referring to FIG. 2, in order to reduce load imbalance between file servers 104 in an environment 100 such as that illustrated in FIG. 1, load monitoring agents may be installed on various components in the environment 100. For example, as shown in FIG. 2, a load monitoring agent 202 may be installed or incorporated into each file server 104 in the environment 100. Similarly, in certain embodiments, a load monitoring agent 200 may also be installed or incorporated into each client node 102 in the environment 100. These load monitoring agents 200, 202 may monitor the load on each of the components 102, 104. For example, a load monitoring agent 200 on a client node 102 may monitor the network load a client node 102 places on the network 100 using a protocol such as NFS or CIFS. By contrast, a load monitoring agent 202 on a file server 104 may monitor load (e.g., processor and memory usage) on the file server 104.

A load monitoring module 204 may also be installed or incorporated into a load balancing server 206 or other load balancing device to monitor the load on each of the components 102, 104. In certain embodiments, the load monitoring module 204 may communicate with the load monitoring agents 200, 202 in each of the components to monitor the load thereon. Using this information, the load balancing server 206 or other load balancing device may take various actions to reduce load imbalance in the environment 100, as will be explained in more detail hereafter.

Figure 3:
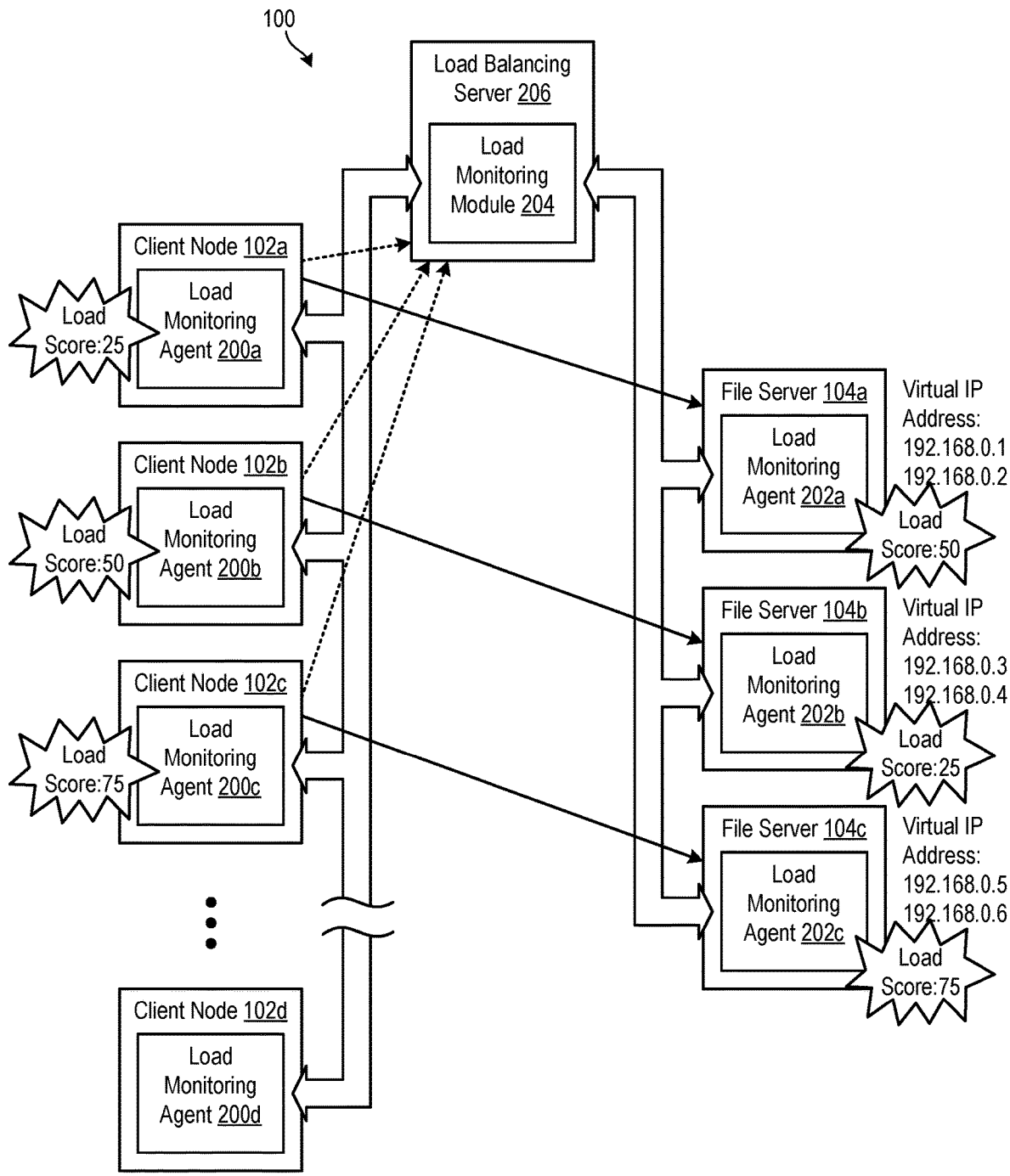
FIG. 3 is a high-level block diagram showing load monitoring of both file servers and client nodes.

Referring to FIG. 3, in certain embodiments, the load measured on each of the components 102, 104 may be represented as a load score. This load score may be calculated periodically and may change over time as the load on the components 102, 104 changes. FIG. 3 shows client nodes 102a-c with load scores of 25, 50, and 75, respectively, and file servers 104a-c with load scores of 50, 25, and 75, respectively. In certain embodiments, a higher load score may indicate a greater load on a respective component 102, 104. The load scores may also indicate load imbalance between the components 102, 104. A greater difference may indicate a greater load imbalance and vice versa. Systems and methods in accordance with the invention may take actions to reduce the difference between load scores and thereby reduce the load imbalance between the components 102, 104.

Figure 4:
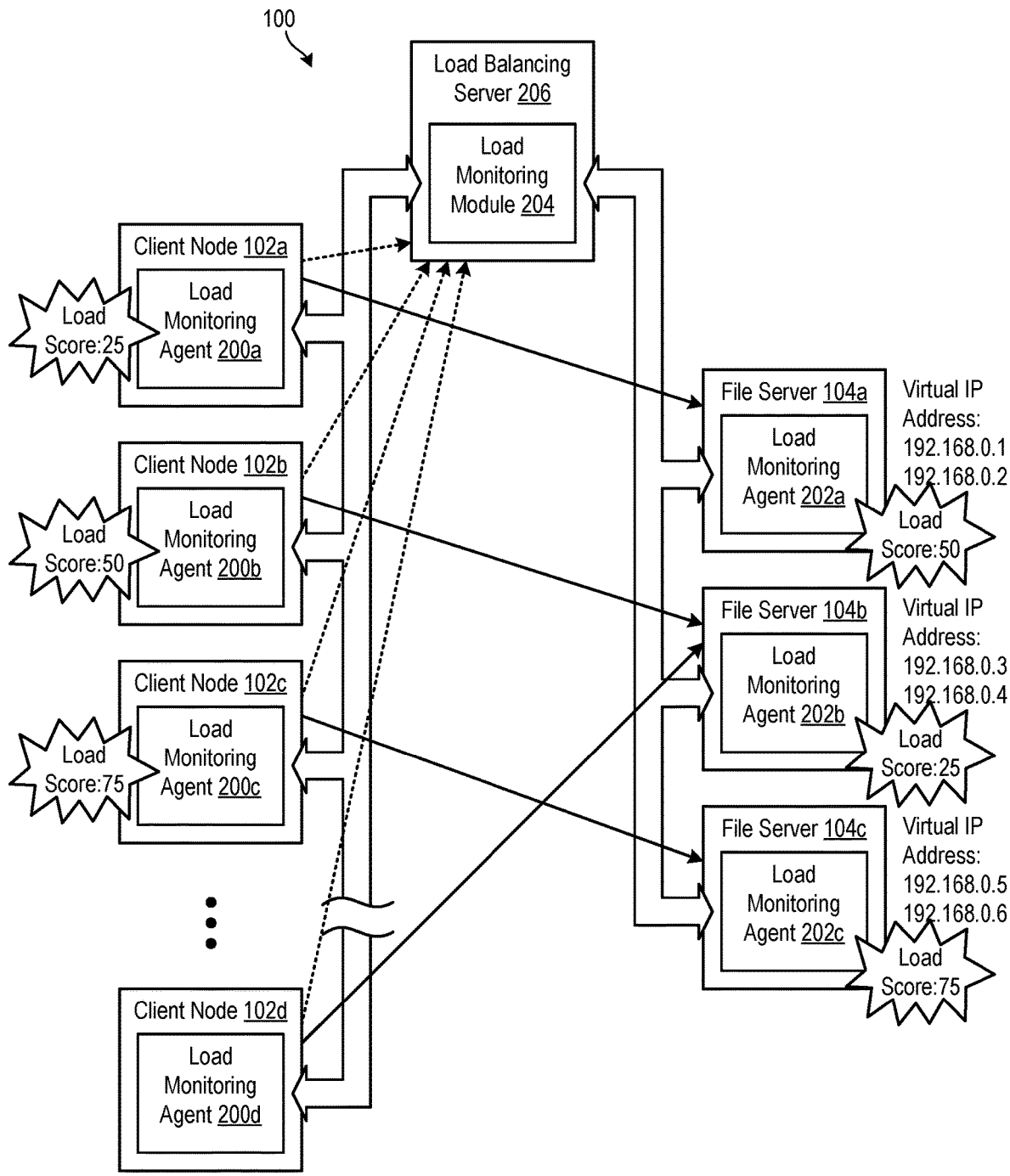
FIG. 4 is a high-level block diagram showing the assignment of addresses to client nodes in a way that reduces load imbalance between file servers.

For example, referring to FIG. 4, when a client node 102d attempts to connect to and mount a file server 104, the client node 102d may request a virtual IP address from the load balancing server 206. In response to the request from the client node 102, the load monitoring module 204 within the load balancing server 206 may determine which file server 104, if assigned to the client node 102, would most effectively reduce the load imbalance between the file servers 104. In certain embodiments, this may be accomplished by simply assigning, to the client node 102, the file server 104 having the lowest load score. In such a case, the load balancing server 206 may return, to the requesting client node 102, a virtual IP address associated with the file server 104 having the lowest load score. The requesting client node 102 may then mount the file server 104 associated with the returned virtual IP address. In the illustrated example of FIG. 4, the load balancing server 206 may return, to the client node 102d, a virtual IP address associated with the file server 104b which has the lowest load score of 25, and the client node 102d would mount the file server 104b.

In certain embodiments, the load monitoring module 204 may maintain various types of information in order to decide how to most effectively reduce load imbalance between the components 104. For example, the load monitoring module 204 may, in certain embodiments, maintain a database of load scores associated with the file servers 104, load scores associated with the client nodes 102, virtual IP addresses associated with each of the file servers 104, client nodes 102 currently assigned to each of the virtual IP addresses, and so forth. The load monitoring module 204 may periodically update these databases as information changes. To accomplish this, the load monitoring module 204 may, for example, periodically poll the components 102, 104 for their load information (e.g., load scores) or information needed to compute their load scores, or the components 102, 104 may periodically or dynamically report load information (e.g., load scores) to the load monitoring module 204.

Figure 5:
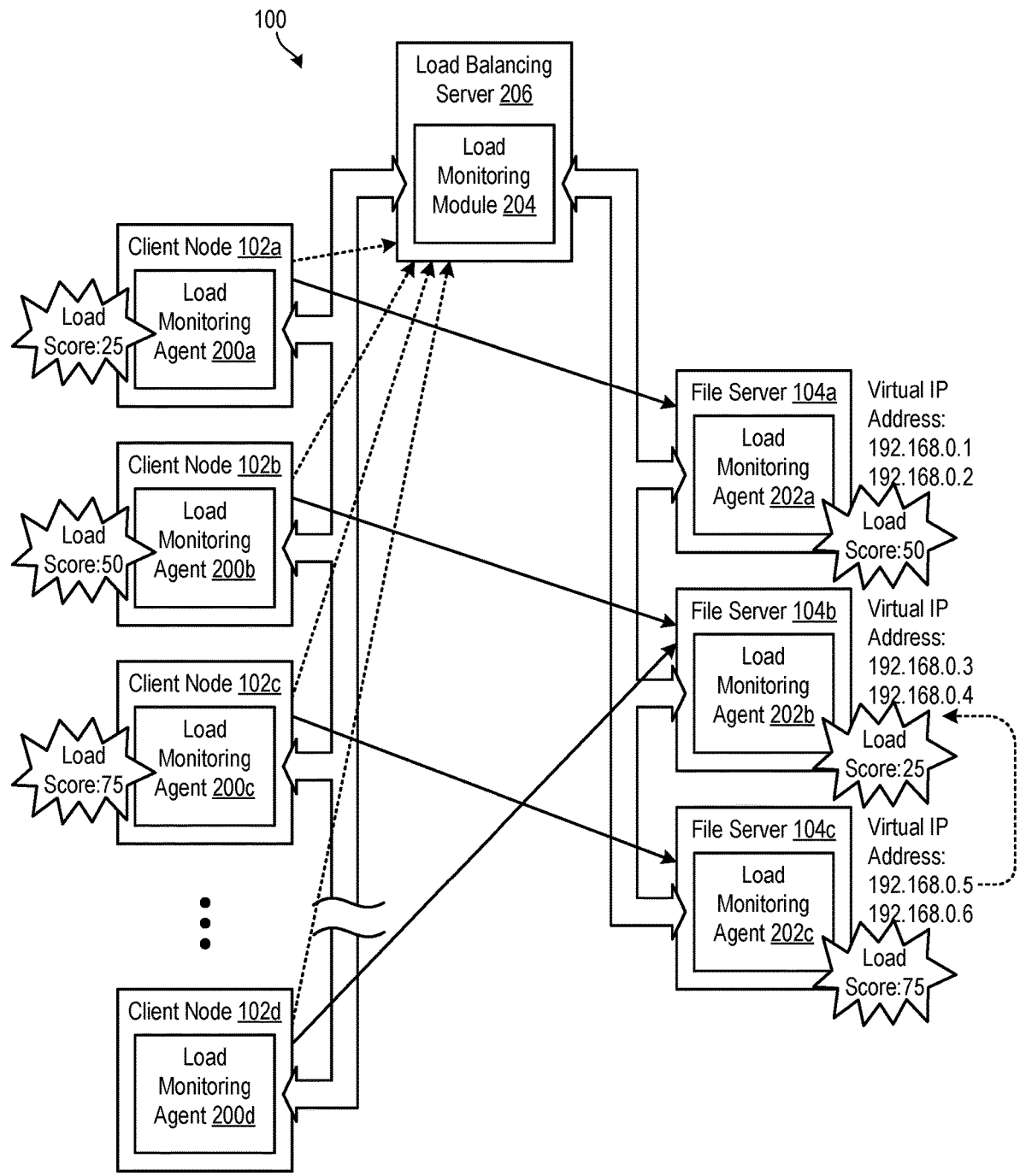
FIG. 5 is a high-level block diagram showing the reassignment of addresses between file servers to reduce load imbalance between the file servers.

Referring to FIG. 5, as previously mentioned, once a client node 102 has received a virtual IP address and has mounted the corresponding file server 104, the client node 102 may continue to access files on the same file server 104 until it unmounts the file server 104. Nevertheless, the loads on the file servers 104 may continue to change even after the client node 102 has mounted the file server 104. The load monitoring module 204, accordingly, may continue to monitor these load changes.

In order to further reduce load imbalance between the file servers 104, systems and methods in accordance with the invention may also reassign virtual IP addresses between the file servers 104. For example, as shown in FIG. 5, because the file server 104c has a higher load score than the file server 104b, the load balancing server 206 or other load balancing device may reassign one or more of the virtual IP addresses of the file server 104c to the file server 104b. This will redirect any file accesses associated with the virtual IP address 192.168.0.5 from the file server 104c to the file server 104b, thereby reducing load imbalance between the file servers 104b, 104c.

In certain embodiments, the reassignment of virtual IP addresses occurs periodically, such as at specific intervals. In other embodiments, the reassignment of virtual IP addresses occurs on an as-need basis, such as when the difference between file server load scores reaches a pre-determined threshold.

Alternatively, or additionally, systems and methods in accordance with the invention may look at the load score of a client node 102 when determining which virtual IP address and associated file server 104 to assign to the client node 102. For example, client nodes 102 with higher load scores (e.g., above a particular threshold) may be assigned to file servers 104 with lower load scores (e.g., below a particular threshold) since the file servers 104 may have greater capacity to service the client nodes 102. The opposite may also be true. That is, client nodes 102 with lower load scores may be assigned to file servers 104 with higher load scores since the client nodes 102 will not place significant additional stress on the file servers 104.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for balancing load across multiple file servers, the method comprising:

measuring load experienced by a plurality of file servers in an active-active configuration;

receiving, from a client node, a request for an address associated with one of the file servers;

determining a particular file server of the plurality that, if assigned to the client node, would reduce load imbalance between the file servers;

returning, to the client node in response to the request, an address associated with the particular file server; and reducing load imbalance between the files servers by reassigning addresses therebetween, wherein reassigning addresses comprises moving an address associated with a first file server of the plurality to a second file server of the plurality.

2. The method of claim 1, wherein measuring the load comprises generating a load score for each file server of the plurality.

3. The method of claim 1, wherein measuring the load comprises measuring the load with a load monitoring agent installed on each file server of the plurality.

4. The method of claim 1, wherein the addresses are virtual IP addresses.

5. The method of claim 1, further comprising measuring load experienced by client nodes accessing the file servers.

6. The method of claim 5, wherein measuring the load experienced by the client nodes comprises measuring the load with load monitoring agents installed on the client nodes.

7. The method of claim 1, wherein the particular file server is a file server of the plurality that is experiencing the least load.

8. A computer program product for balancing load across multiple file servers, the computer program product comprising a non-transitory computer-readable storage medium having computer-usable program code embodied therein, the computer-usable program code configured to perform the following when executed by at least one processor:

measure load experienced by a plurality of file servers in an active-active configuration;

receive, from a client node, a request for an address associated with one of the file servers;

determine a particular file server of the plurality that, if assigned to the client node, would reduce load imbalance between the file servers;

return, to the client node in response to the request, an address associated with the particular file server; and reducing load imbalance between the files servers by reassigning addresses therebetween, wherein reassigning addresses comprises moving an address associated with a first file server of the plurality to a second file server of the plurality.

9. The computer program product of claim 8, wherein measuring the load comprises generating a load score for each file server of the plurality.

10. The computer program product of claim 8, wherein measuring the load comprises measuring the load with a load monitoring agent installed on each file server of the plurality.

11. The computer program product of claim 8, wherein the addresses are virtual IP addresses.

12. The computer program product of claim 8, wherein the computer-usable program code is further configured to measure load experienced by client nodes accessing the file servers.

13. The computer program product of claim 12, wherein measuring the load experienced by the client nodes comprises measuring the load with load monitoring agents installed on the client nodes.

14. The computer program product of claim 8, wherein the particular file server is a file server of the plurality that is experiencing the least load.

15. A system for balancing load across multiple file servers, the system comprising:

at least one processor;

at least one memory device coupled to the at least one processor and storing instructions for execution on the at least one processor, the instructions causing the at least one processor to:

measure load experienced by a plurality of file servers in an active-active configuration;

receive, from a client node, a request for an address associated with one of the file servers;

determine a particular file server of the plurality that, if assigned to the client node, would reduce load imbalance between the file servers;

return, to the client node in response to the request, an address associated with the particular file server; and reduce load imbalance between the files servers by reassigning addresses therebetween, wherein reassigning addresses comprises moving an address associated with a first file server of the plurality to a second file server of the plurality.

16. The system of claim 15, wherein measuring the load comprises generating a load score for each file server of the plurality.

17. The system of claim 15, wherein measuring the load comprises measuring the load with a load monitoring agent installed on each file server of the plurality.

18. The system of claim 15, wherein the addresses are virtual IP addresses.

19. The system of claim 15, wherein the instructions further cause the at least one processor to measure load experienced by client nodes accessing the file servers.

20. The system of claim 15, wherein the particular file server is a file server of the plurality that is experiencing the least load.

* * * * *